(12) United States Patent
Potlapally et al.

(10) Patent No.: US 10,409,985 B2
(45) Date of Patent: Sep. 10, 2019

(54) TRUSTED COMPUTING HOST

(71) Applicant: Amazon Technologies, Inc., Reno, NV (US)

(72) Inventors: Nachiketh Rao Potlapally, Arlington, VA (US); Michael David Marr, Monroe, WA (US); Eric Jason Brandwine, Haymarket, VA (US); Donald Lee Bailey, Penn Laird, VA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 17 days.

(21) Appl. No.: 15/436,573

(22) Filed: Feb. 17, 2017

(65) Prior Publication Data

US 2017/0235946 A1    Aug. 17, 2017

Related U.S. Application Data

(63) Continuation of application No. 14/868,006, filed on Sep. 28, 2015, now Pat. No. 9,576,155, which is a continuation of application No. 13/912,948, filed on Jun. 7, 2013, now Pat. No. 9,147,086.

(51) Int. Cl.
| | |
|---|---|
| *H04L 29/00* | (2006.01) |
| *G06F 21/55* | (2013.01) |
| *G06F 21/64* | (2013.01) |
| *G06F 21/57* | (2013.01) |
| *G06F 21/60* | (2013.01) |

(Continued)

(52) U.S. Cl.
CPC .............. *G06F 21/55* (2013.01); *G06F 21/57* (2013.01); *G06F 21/602* (2013.01); *G06F 21/64* (2013.01); *H04L 9/0861* (2013.01); *H04L 9/30* (2013.01)

(58) Field of Classification Search
CPC ......... G06F 21/55; G06F 21/57; G06F 21/602
USPC ..................................................... 726/26
See application file for complete search history.

(56) References Cited

U.S. PATENT DOCUMENTS

| | | | |
|---|---|---|---|
| 6,088,802 A * | 7/2000 | Bialick ................ | G06F 21/34 726/3 |
| 7,941,804 B1 | 5/2011 | Herington et al. | |

(Continued)

OTHER PUBLICATIONS

Non Final Office Action dated Feb. 12, 2015, received in U.S. Appl. No. 13/912,948.

(Continued)

*Primary Examiner* — Anthony D Brown
*Assistant Examiner* — Michael D Anderson
(74) *Attorney, Agent, or Firm* — Hogan Lovells US, LLP

(57) ABSTRACT

A trusted computing host is described that provides various security computations and other functions in a distributed multitenant and/or virtualized computing environment. The trusted host computing device can communicate with one or more host computing devices that host virtual machines to provide a number of security-related functions, including but not limited to boot firmware measurement, cryptographic key management, remote attestation, as well as security and forensics management. The trusted computing host maintains an isolated partition for each host computing device in the environment and communicates with peripheral cards on host computing devices in order to provide one or more security functions.

20 Claims, 12 Drawing Sheets

(51) Int. Cl.
*H04L 9/08* (2006.01)
*H04L 9/30* (2006.01)

(56) References Cited

U.S. PATENT DOCUMENTS

| | | | |
|---|---|---|---|
| 8,214,653 B1 * | 7/2012 | Marr | G06F 21/572 |
| | | | 380/286 |
| 9,147,086 B1 | 9/2015 | Potlapally et al. | |
| 2010/0179940 A1 * | 7/2010 | Gilder | G06F 17/30566 |
| | | | 707/622 |
| 2012/0084549 A1 * | 4/2012 | Mackintosh | G06F 21/575 |
| | | | 713/2 |
| 2016/0070929 A1 | 3/2016 | Potlapally et al. | |

OTHER PUBLICATIONS

Notice of Allowance dated Jun. 10, 2015, received in U.S. Appl. No. 13/912,948.
Non Final Office Action dated Mar. 22, 2016, received in U.S. Appl. No. 14/868,006.
Notice of Allowance dated Oct. 24, 2016, received in U.S. Appl. No. 14/868,006.

* cited by examiner

TRUSTED COMPUTING HOST

CROSS-REFERENCES TO RELATED APPLICATIONS

This application is a continuation of U.S. patent application Ser. No. 14/868,006, filed on Sep. 28, 2015, which is a continuation of issued U.S. Pat. No. 9,147,086, issued on Sep. 29, 2015, which are incorporated herein by references for all purposes.

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In order to secure access to the customer's resources in the cloud and to help ensure that those resources perform tasks only under direction of that customer, the service provider can utilize a variety of different security approaches and policies. In many cases, such security techniques employ cryptographic services, such as services based on symmetric or asymmetric cryptography. Due to the multitenant nature of the computing environment, it can be important to ensure that malicious or unscrupulous users are not able to compromise those cryptographic services.

BRIEF DESCRIPTION OF THE DRAWINGS

Various embodiments in accordance with the present disclosure will be described with reference to the drawings, in which.

DETAILED DESCRIPTION

Figure 1:
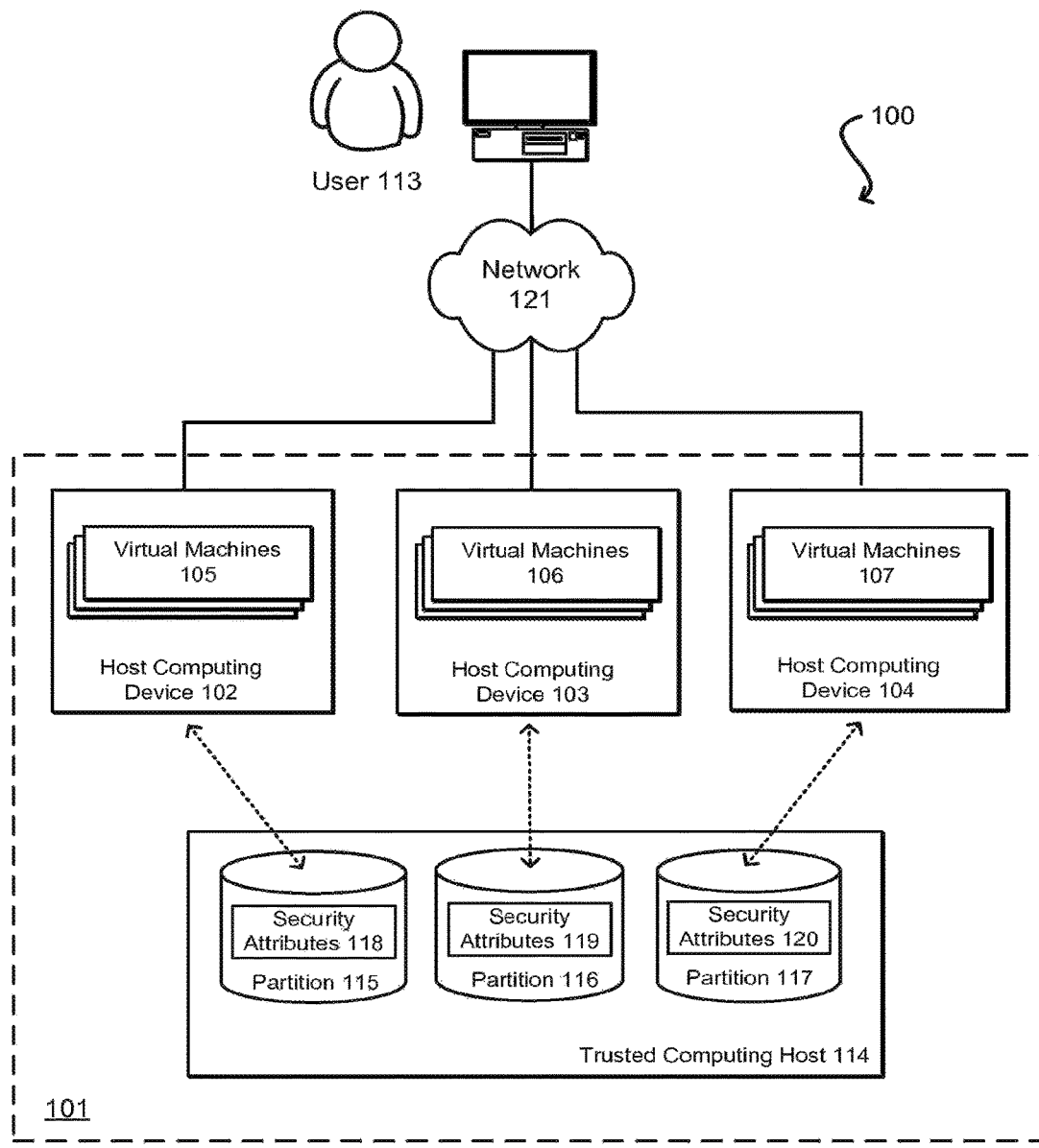
FIG. 1 illustrates an example of a trusted computing host in a virtualized computing environment, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for providing security-related functions for computing resources. In particular, embodiments described herein provide a trusted computing (TC) host that provides various security functions and computations in a distributed multitenant and/or virtualized computing environment. In various embodiments, the trusted computing host can be implemented as a physical computing device, a virtual machine running on a physical computing device or other hardware/software component. In the virtualized computing environment, the trusted host computing device can communicate with one or more host computing devices that host virtual machines to provide a number of security-related functions, including but not limited to boot firmware measurement, cryptographic key management, remote attestation, as well as security and forensics management. In at least some embodiments, the trusted computing host communicates with peripheral cards (or other hardware) on host computing devices in order to provide the security-related functions.

In accordance with an embodiment, the trusted computing host maintains a dedicated container (e.g., isolated partition) for each host computing device in the virtualized computing environment. This container is used to store security attributes and to perform security computations and functions on behalf of the host computing device associated with the container. For example, one or more cryptographic keys (e.g., public keys, private keys, etc.) for a host computing device can be stored in the isolated partition on the TC host where the isolated partition is associated with the respective host computing device. Similarly, the security attributes may include public key certificates, boot firmware measurements, or other credentials of the host computing device associated with the isolated partition. These security attributes can be utilized by the TC host to provide one or more security functions to the host computing devices in the virtualized computing environment. For example, the TC host may perform remote attestation of the host computing devices to external entities, generate and manage cryptographic keys on behalf of the host computing devices, monitor various operational parameters of the host computing devices and perform various other security and forensics related functions.

As mentioned above, the trusted computing (TC) can be utilized in a multi-tenant and/or virtualized shared resource environment, often referred to as a cloud computing environment. Conventionally, in this type of environment, host computing devices utilize virtualization technology to provision one or more virtual machine instances that are associated with different customers of a service provider or other operator of the environment (e.g., cloud computing provider). These virtual machine instances are hosted on the computing device using a hypervisor (or other virtualization technology) and each virtual machine instance can contain a guest operating system, including a kernel, device drivers and other OS components. The host computing devices and other physical resources to host the virtual machines are usually provided by the service provider (or other operator of the environment) and reside in resource centers, such as a data centers, server farms, content delivery network (CDNs) points-of-presence (POPs) and the like.

The use of a trusted computing (TC) host for security-related functions in the virtualized environment provides a number of distinct advantages. For example, because the credentials and other secret materials (e.g., cryptographic keys, certificates, etc.) of the host device (which may be hosting multiple virtual machines of multiple users) are not stored on the host device itself but are kept in an external secure location (i.e., the TC host), any compromise of a host device would not necessarily compromise the credentials and other secrets stored on the TC host. For example, in the event a virtual machine provisioned for one user breaks out of its isolated execution environment on the host and begins to operate in a high privilege mode (e.g., during a "virtual machine escape"), the credentials and other secret materials belonging to other virtual machines and other users on that host would not be compromised. Another advantage can occur during migration of the virtual machines from one host computing device to another. When virtual machines are moved (i.e., migrated) from a source host device to a destination host device, the credentials and other security attributes do not need to be transferred from the source host device to the destination host. Rather, the migrated virtual machine can simply start up on the new host and make a secure connection to the TC host to receive the cryptographic material from the TC host. A number of other advantages can also be obtained by the use of a TC host for security functions, as will be apparent to one of ordinary skill in the art.

FIG. 1 illustrates an example 100 of a trusted computing host in a virtualized computing environment, in accordance with various embodiments. In the illustrated embodiment, the trusted computing (TC) host 114 can be a device comprised of computing hardware running security software (e.g., kernel and drivers) to provide one or more security related services to other host computing devices (102, 103, 104) that host virtual machines (105, 106, 107) in the distributed virtualized computing environment 101. The virtual machines (105, 106, 107) can be provisioned on the host computing devices for a user 113, where the virtual machines execute applications or other services on behalf of the user 113. In the illustrated embodiment, for every host computing device (102, 103, 104) in the environment, the TC host 114 creates and maintains a dedicated and isolated partition (115, 116, 117) or other container for performing security-related computations and storing security attributes (118, 119, 120) associated with that respective host computing device.

In various embodiments, the security attributes (118, 119, 120) can include host boot firmware measurements, cryptographic keys, and certificates (e.g., public key certificates), among others. The TC host 114 may perform one or more security functions (e.g., cryptographic services) on behalf of the host computing devices by utilizing the security attributes (118, 119, 120). For example, the TC host 114 may receive a boot firmware measurement from a host computing device and record the boot firmware measurement in the isolated partition associated with that host computing device. The TC host may then seal (e.g., hash) information to the recorded boot firmware measurement, or use the boot firmware measurement to remotely attest the identity of the host computing device to external entities. Additionally, the TC host 114 may contain pre-computed reference values for all host computing devices and, upon receiving the boot firmware measurement from a host, compare the boot firmware measurement to the respective pre-computed reference value in order to verify that the software on the host has not been corrupted. As another example, the TC host 114 may generate keys, certificates or other credentials on behalf of the host computing devices and provide those cryptographic materials to the host computing device in response to receiving requests from the hosts (e.g., API requests).

In accordance with an embodiment, the isolated partitions (115, 116, 117) are encrypted using cryptographic keys associated with the host computing devices, and stored in local storage on the TC host 114. For example, as shown in the figure, partition 115 is encrypted using a cryptographic key associated with host computing device 102, partition 116 is encrypted using a cryptographic key associated with host computing device 103 and partition 117 is encrypted using a cryptographic key associated with host computing device 104. In various embodiments, any encryption technique can be utilized to encrypt the partitions. The partitions can be encrypted using asymmetric or symmetric cryptography. For example, each partition may be encrypted using a public key and may only be decryptable using a private key associated with the public key. In some embodiments, the private key may be stored remotely with respect to the TC host, such as on the respective host computing devices, or other locations.

In some embodiments, the TC host 114 may include one or more cryptographic co-processors for accelerating cryptographic computations and tamper-proofing techniques to protect against physical attacks, such as power glitching, removing dynamic random access memory (DRAM) cards, un-soldering Flash memory, or the like. For example, the TC host 114 may include a cryptographic accelerator that performs computationally intensive encoding and decoding of information (e.g., encrypting/decrypting, signing/verifying, etc.). Similarly, the TC host may have redundant power supplies, secure housing (e.g., locking mechanisms), and/or may reside in a secured area of a resource center. Additionally, the TC host 114 may have encrypted native physical storage to prevent untrusted parties from reading the information stored on the TC host.

In some embodiments, the service provider (or other operator of the virtualized environment) can provide a console, API or other interface to enable the user 113 (e.g., customer of the service provider) to sign up for utilizing the security functions provided by the TC host 114. The user 113 may select the services that they desire by using the interface provided by the operator. As a result of signing up for the service, one or more application programming interface (API) calls are exposed to the user on the virtual machine instance(s) provisioned for that user. For example, the API calls may include calls to obtain/manage credentials and other security attributes, such as getKey, storeKey, verifyCertificate, or the like. By utilizing the API calls, the user 113 may be able to access security functions provided by the TC host 114.

In order to enable this functionality, the host computing device may contain logic for receiving an API request from a user 113 (e.g., customer), authenticating the user and determining whether the user is authorized to make invoke the API call. For example, the host computing device may inspect a security policy associated with the user in order to determine whether the user is authorized to invoke the API call. If the user is authorized to invoke the API call, the host computing device routes the API call to the particular partition of the TC host 114 associated with the respective host computing device, where that virtual machine's credentials and/or other security attributes are cryptographically stored and sealed. In some embodiments, the host computing device may establish a secure communication channel with the TC host to obtain the credentials from the TC host. This can be done with standard secure communication protocols involving authentication, integrity checks and encryption, as described in further detail below, with reference to FIG. 2.

It should be noted that although FIG. 1 illustrates a single trusted computing host, in various other embodiments, the environment 101 may include multiple TC hosts, which in some cases may work together to provide the security related functionality for host computing devices. Similarly, although the TC host is implemented as a dedicated physical device in this embodiment, the TC host may alternatively be implemented as a virtual machine or other software component running on a host computing device in the virtualized computing environment 101.

Figure 2:
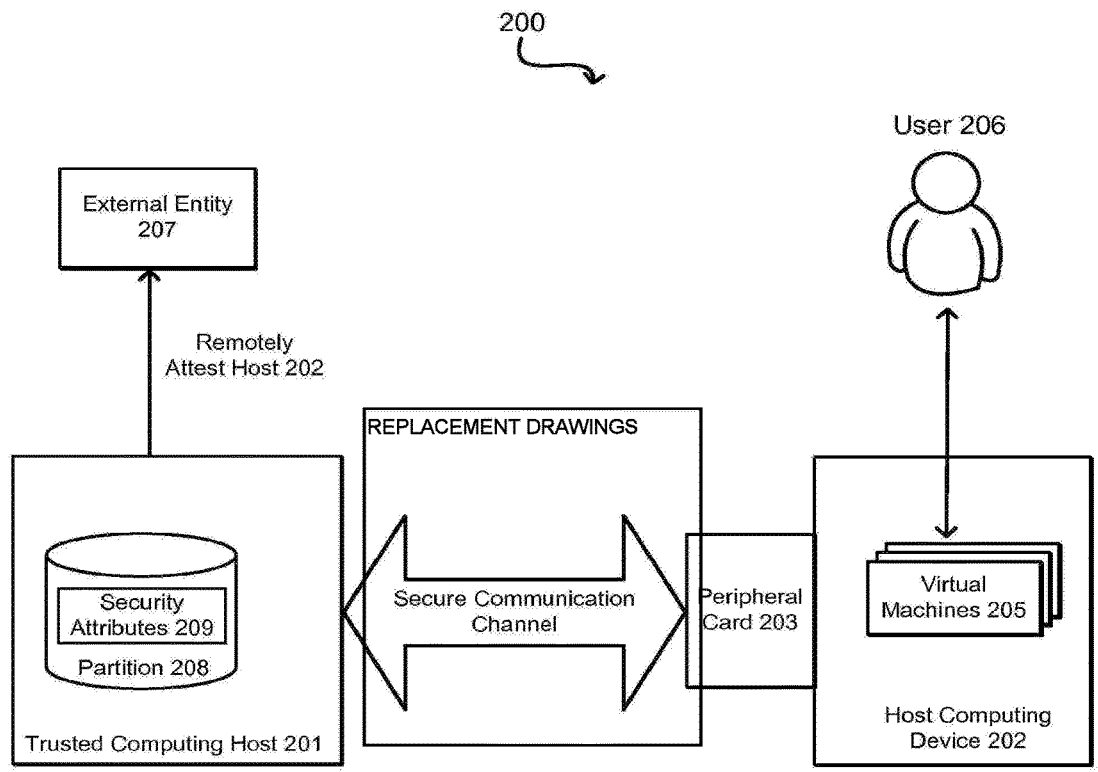
FIG. 2 illustrates an example of a trusted computing host in communication with a peripheral card on a host computing device, in accordance with various embodiments.

FIG. 2 illustrates an example 200 of a trusted computing host in communication with a peripheral card on a host computing device, in accordance with various embodiments. In the illustrated embodiment, the TC host 201 can establish a secure communication channel with a peripheral card 203 (or other hardware device) on the host 202 in order to provide the security services to the host computing device 202. For example, the peripheral card 203 can be implemented as a peripheral component interconnect express (PCIe) card, a modified baseboard management controller (BMC), or an embedded controller (EC) in the chipset. In one embodiment, the secure channel may be established by the TC host and the host computing device mutually authenticating themselves to one another and establishing a session key that will be used to encrypt all communications transmitted between the TC host and the host computing device. In some embodiments, to facilitate the secure communication with the TC host 201 and associated cryptographic operations, the peripheral card 203 can have embedded cryptographic key material. For example, the peripheral card 203 may include one or more private keys or public keys used to encrypt/verify information communicated between the TC host 201 and the host computing device 202. In some embodiments, the keys may be permanently "burned" into memory of the peripheral card. In other embodiments, the keys may be conventionally stored in random access memory of the host computing device. The secure communication channel may also be established by any other known method of transferring data that is resistant to overhearing and tampering.

In various embodiments, the peripheral card 203 may have direct memory access (DMA) privileges to access entire host memory (e.g., through IOMMU/VT-d settings), and out-of-band (OOB) networking capability (i.e., independent of the networking stack of the host computing device). DMA privileges enable the peripheral card to directly apply software patches or other modifications received from the TC host to the host computing device. The OOB networking ability can allow the TC host 201 to reach the host computing device 202 to perform diagnosis and recovery even if the host computing device 202 is unreachable via a network connection due to corruption of its native software stack.

In some embodiments, the peripheral card 203 can work with the TC host 201 in order to provide boot firmware measurement (or other value) and remote attestation on behalf of the host computing device 202. For example, in order to record a boot firmware measurement, the peripheral card 203 on the host computing device 202 can have the ability to access one or more memory locations on the host computing device 202 using direct memory access (DMA) and hash the values of those locations to obtain a boot firmware measurement. In some embodiments, the peripheral card may also trap one or more write operations to specific address ranges (e.g., traditional TPM address ranges, such as 0xfed40000-0xfed4ffff), and send the results of those write operations to the TC host 201 using the secure communication channel. In addition, some functionality provided in remote boot features such as pre-boot execution environment (PXE) can be accessed to enable the boot measurement process. Because the service provider (or other operator of the virtualized environment) knows the version of firmware and other software installed on the host computing device 202, the provider can pre-compute a reference cryptographic hash measurement for the host computing device 202. In one embodiment, upon receiving an initial boot firmware measurement from the host computing device 202, the TC host 201 compares the received value with the pre-computed reference value (or a list of trusted values) stored in the isolated partition 208, and check whether they match. A mismatch may indicate corruption of the software stack on the host computing device 202 and the TC host 201 can take one or more corrective actions (e.g., as prescribed by a security policy of the service provider). Furthermore, the firmware of the host computing device 202 may be periodically re-measured at runtime. For example, the peripheral card 203 may periodically re-measure the firmware of the host computing device 202 and transmit the re-measured firmware values to the TC host 201. The TC host 201 can compare the re-measured firmware values to the initial boot firmware measurement recorded in the partition 208 to verify the host computing device. If the re-measured values no longer match the initial boot firmware measurement, the host computing device may be deemed compromised. Additionally or in the alternative, once the boot firmware measurement is obtained for the host computing device 202, the TC host 201 may use the boot firmware measurement to seal private or secret information to that boot firmware measurement. For example, the TC host 201 may encrypt one or more credentials by using a key based on the boot firmware measurement, such that the data may only be decrypted by supplying a matching boot firmware measurement. In this manner, no entity would be able to access the sealed private information unless that entity was able to provide a matching boot firmware measurement.

In some embodiments, the TC host 201 can act as a trusted proxy and perform remote attestation of the host computing device 202 to one or more external entities 207 based on the boot firmware measurements and/or other security attributes 209 recorded in the isolated partition 206. For example, once the boot firmware measurement has been stored on the TC host 201, the TC host 201 may receive a request from an external party 207, requesting that the identity of the host computing device 202 or virtual machine 205 be attested to by the TC host. In response to the request, the TC host 201 may compare a value received from the external entity 207 to the boot firmware measurement stored on the TC host 201 in order to attest the identity of the host computing device 202. In various embodiments, remote attestation can use the boot firmware measurement or any other hash-key summary of the hardware and software configuration of the host computing device 202.

Figure 3:
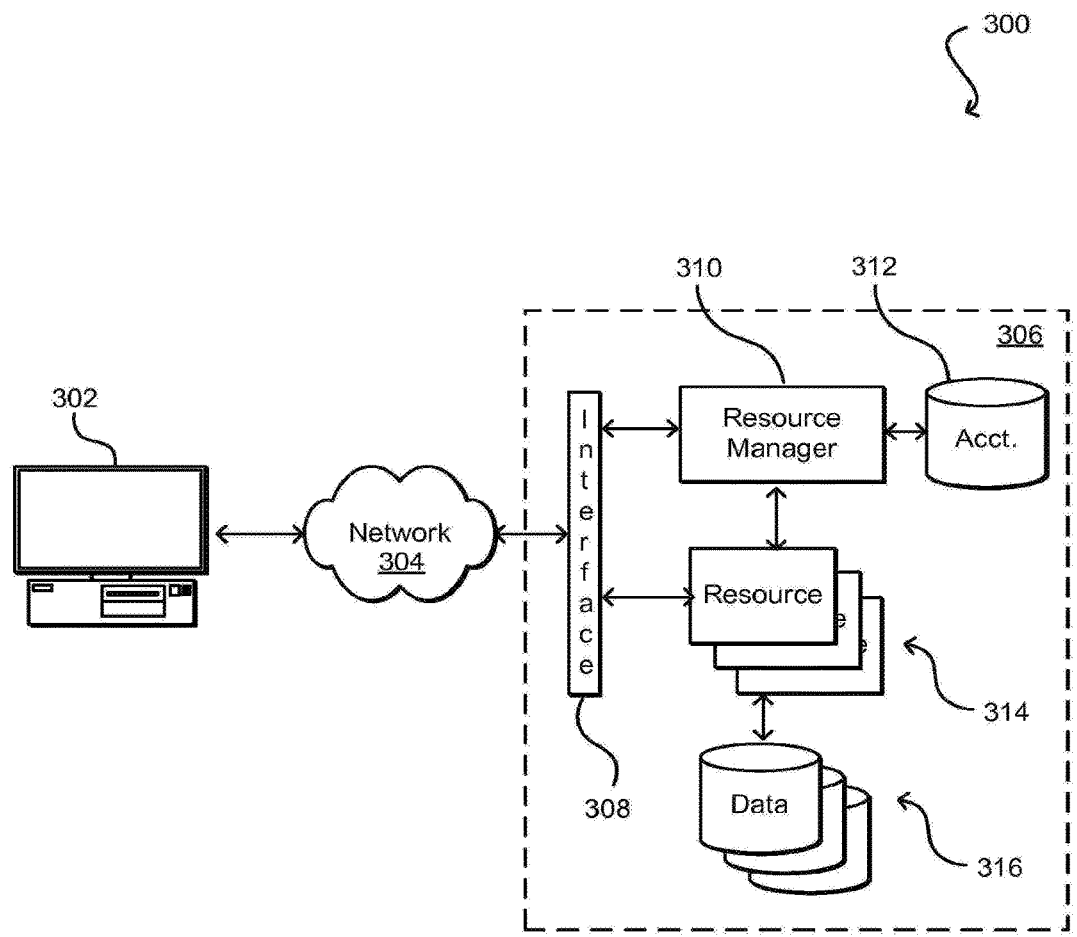
FIG. 3 illustrates an example of a multi-tenant virtualized computing environment in which aspects of the various embodiments can be implemented.

FIG. 3 illustrates an example of a virtualized computing environment 300 in which aspects of the various embodiments can be implemented. In this example, a customer of a multi-tenant and/or shared resource virtualized computing environment 306 is able to utilize a client device 302 to submit requests across at least one network 304 to at least one designated address or interface of the environment 306. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 304 can include any appropriate network, including an intranet, the Internet, a cellular network, a local area network (LAN), or any other such network or combination, and communication over the network can be enabled via wired and/or wireless connections. The virtualized computing environment 306 can be supported and/or offered by a resource provider, and can include any appropriate components for receiving requests and returning information or performing actions in response to those requests. As an example, the environment might include Web servers and/or application servers for receiving and processing requests, then returning data, Web pages, video, audio, or other such content or information in response to the request. In many cases, the customer will have an account with the provider of the virtualized computing environment that indicates which resources or types of resources the customer can access, an amount of that access, types of tasks that can be performed with that access, or other such terms. One or more users might be associated with the customer, and thus can be able to access the resources per the customer account.

In various embodiments, the environment 306 may include various types of resources that can be utilized by multiple users for a variety of different purposes. In at least some embodiments, all or a portion of a given resource or set of resources might be allocated to a particular customer or allocated for a particular task, for at least a determined period of time. The sharing of these resources from a multi-tenant virtualized computing environment is often referred to as resource sharing, Web services, or "cloud computing," among other such terms and depending upon the specific environment and/or implementation. In this example the multi-tenant virtualized computing environment includes a plurality of resources 314 of one or more types. These types can include, for example, application servers operable to process instructions provided by a user or database servers operable to process data stored in one or more data stores 316 in response to a user request. As known for such purposes, the customer can also reserve at least a portion of the data storage in a given data store. Methods for enabling a customer to reserve various resources and resource instances are well known in the art, such that detailed description of the entire process, and explanation of all possible components, will not be discussed in detail herein.

In at least some embodiments, a user wanting to utilize at least a portion of the resources 314 can submit a request that is received to an interface layer 308 of the multi-tenant virtualized computing environment 306. The interface layer can include application programming interfaces (APIs) or other exposed interfaces enabling a user to submit requests to the multi-tenant virtualized computing environment. The interface layer 308 in this example can also include other components as well, such as at least one Web server, routing components, load balancers, and the like. When a request to provision a resource is received to the interface layer 308, for example, information for the request can be directed to a resource manager 310 or other such system, service, or component configured to manage user accounts and information, resource provisioning and usage, and other such aspects. A resource manager 310 receiving the request can perform tasks such as to authenticate an identity of the user submitting the request, as well as to determine whether that user has an existing account, or is associated with a customer having an existing account, with the resource provider, where the account data may be stored in at least one data store 312 in the environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user is not associated with a valid account with the provider, an associated account does not enable access to the type of resources specified in the request, or another such reason is preventing the user from obtaining access to such resources, a communication can be sent to the user (or associated customer) to enable the user to create or modify an account, or change the resources specified in the request, among other such options.

Once the user and/or request is authenticated, the account verified, and the resources allocated, the user can utilize the allocated resource(s) for the specified capacity, amount of data transfer, period of time, or other such metric. In at least some embodiments, a user might provide a session token or other such credentials with subsequent requests in order to enable those requests to be processed on that user session. The user can receive a resource identifier, specific address, or other such information that can enable the client device 302 to communicate with an allocated resource without having to communicate with the resource manager 310, at least until such time as a relevant aspect of the user account changes, the user is no longer granted access to the resource, or another such aspect changes.

The resource manager 310 (or another such system or service) in this example can also function as a virtual layer of hardware and software components that handles control functions in addition to management actions, as may include provisioning, scaling, replication, etc. The resource manager can utilize dedicated APIs in the interface layer 308, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 308 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 4:
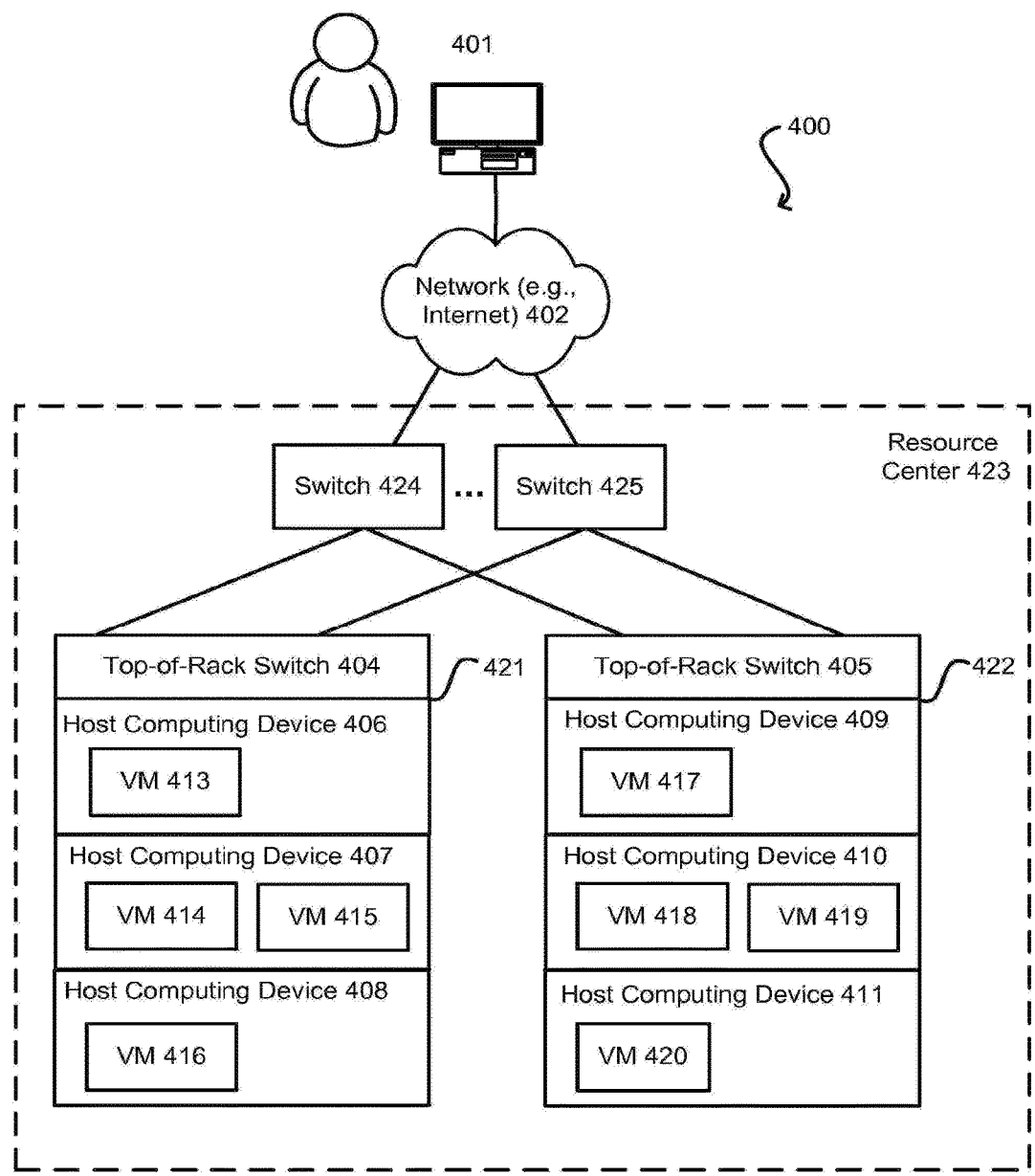
FIG. 4 illustrates an example of a resource center of a service provider or other operator of the virtualized computing environment, in accordance with various embodiments.

FIG. 4 illustrates an example 400 of a resource center of a service provider or other operator of the virtualized computing environment, in accordance with various embodiments. In the illustrated embodiment, a service provider (e.g., a cloud computing resource provider) can maintain one or more resource centers 423 (e.g., data centers, server farms, etc.) that store the physical resources (e.g., host computing devices, etc.) of the service provider. These physical resources can be used to host a number of virtual machine instances or virtual servers that can be provided to users 401 over a network 402, such as the Internet. For example, when a user wants to execute an application using the physical resources of the service provider, he or she may request the service provider to provision a virtual machine for the user, which will be used to deploy and execute the application. As demand for the user's application grows, the user can request that more virtual machines be provisioned to balance the load, request creation of one or more virtual private networks (VPNs) and the like. Access to all of these resources provisioned for the user (e.g., customer) may be controlled by using one or more security policies specified by the user, as previously described.

In the illustrated example, the resource center 423 of the service provider may include one or more racks 421, 422 of host computing devices (406, 407, 408, 409, 410) wherein each host computing device on a particular rack is connected to a single top-of-rack (TOR) switch (404, 405). These TOR switches can be further connected to one or more other switches (424, 425) which enable the host computing devices to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host computing device can host one or more virtual machine instances (413, 414, 415, 416, 417, 418, 419, 420) that have been provisioned for the customers of the service provider to execute the various applications and services on behalf of those customers. Each virtual machine can be provisioned with its own operating system (OS) including a kernel, drivers, process management and the like.

When a customer wishes to obtain a virtual machine instance, the customer can first submit a request to the service provider, indicating the type of VM they would like to use. The service provider may carry out the processes to provision the virtual machine instance which will be hosted on the physical resources (e.g., host computing devices) of the service provider. The virtual machine instance can then be used to execute the various applications and services on behalf of the customer, utilizing the resources of the service provider. In this environment, the trusted computing (TC) host can be an independent physical computing device residing in the resource center of the service provider. In another embodiment, the TC host may be a virtual machine instance running on a host computing device. In either event, the cryptographic keys, credentials and other security attributes can be managed for each host computing device and virtual machine using the TC host, as previously described.

Figure 5:
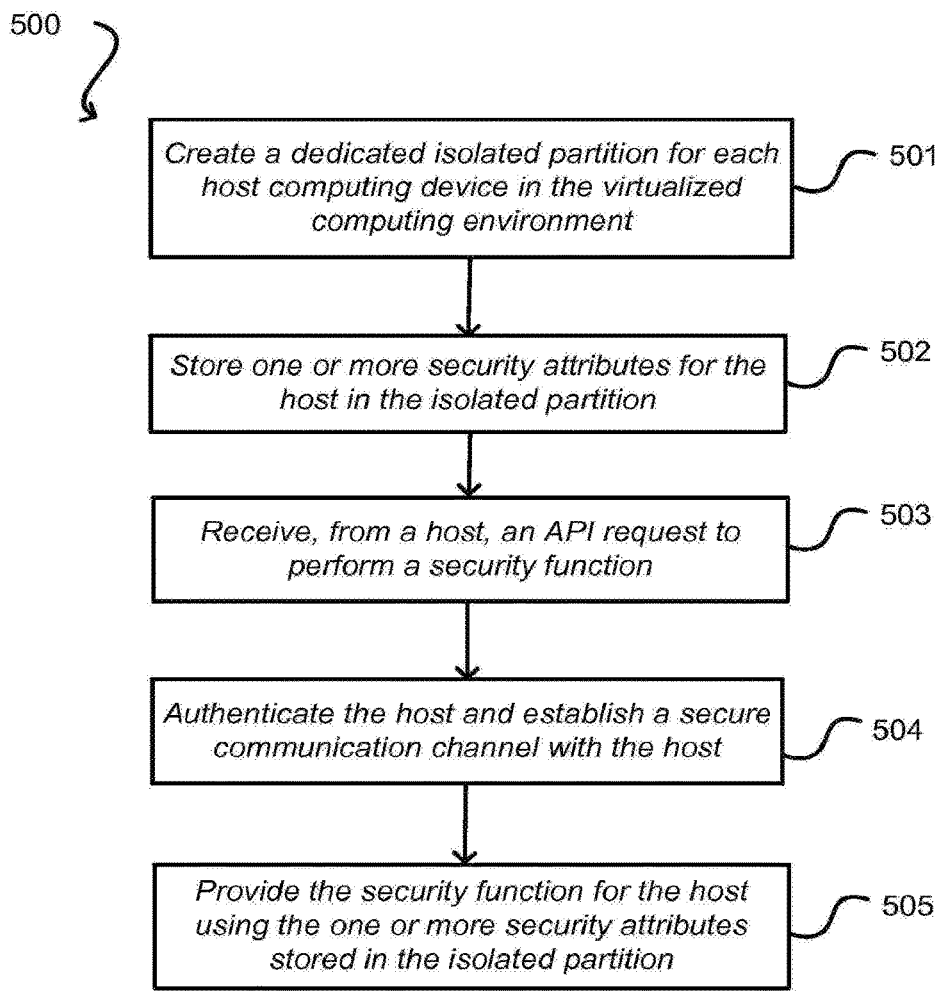
FIG. 5 illustrates an example process for utilizing a trusted computing host to provide one or more security services, in accordance with various embodiments.

FIG. 5 illustrates an example process 500 for utilizing a trusted computing host to provide one or more security services, in accordance with various embodiments. Although this figure as well as other process flows contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 501, the trusted computing host creates a dedicated isolated partition for each host computing device in the virtualized computing environment. The partition may be a database partition, physical disk partition, logical partition or any other storage compartment designated for the host computing device. In at least some embodiments, the partitions may be isolated from each other and each partition may be encrypted using a key associated with the host computing device. In operation 502, the TC host stores one or more security attributes for the host computing device in the isolated partition. The security attributes may be stored as part of creating the isolated partition or as a later processing step after the partition has been created. The security attributes may include cryptographic keys, certificates and boot firmware measurements, among other such attributes. In various embodiments, the security attributes may be received from the host computing device, a peripheral card or generated by the TC host.

In operation 503, the TC host receives a request, such as an API request, to perform a security function (e.g., cryptographic service) on behalf of the host computing device. The request may be received from a peripheral card on the host computing device. For example, the host computing device may request access to a cryptographic key or a public key certificate, or may request a certificate signing request (CSR) to be submitted to a certificate authority (CA). In operation 504, the TC host authenticates the host computing device and establishes a secure communication channel with the host. The secure channel can be set up by performing mutual authentication and establishing a key used to encrypt all communications sent through the channel.

In operation 505, the TC host performs the security function on behalf of the host computing device by utilizing the one or more security attributes stored in the respective partition. For example, the TC host may generate one or more cryptographic keys for the host computing device and provide the keys to the host over the secure channel. Similarly, the TC host may receive a boot firmware measurement from the host computing device and compare the received boot firmware measurement to a reference value stored in the isolated partition associated with the host computing device to verify the boot firmware measurement. In various embodiments, any number of other security computations or other functions can be provided by the TC host, as described throughout this specification.

Figure 6:
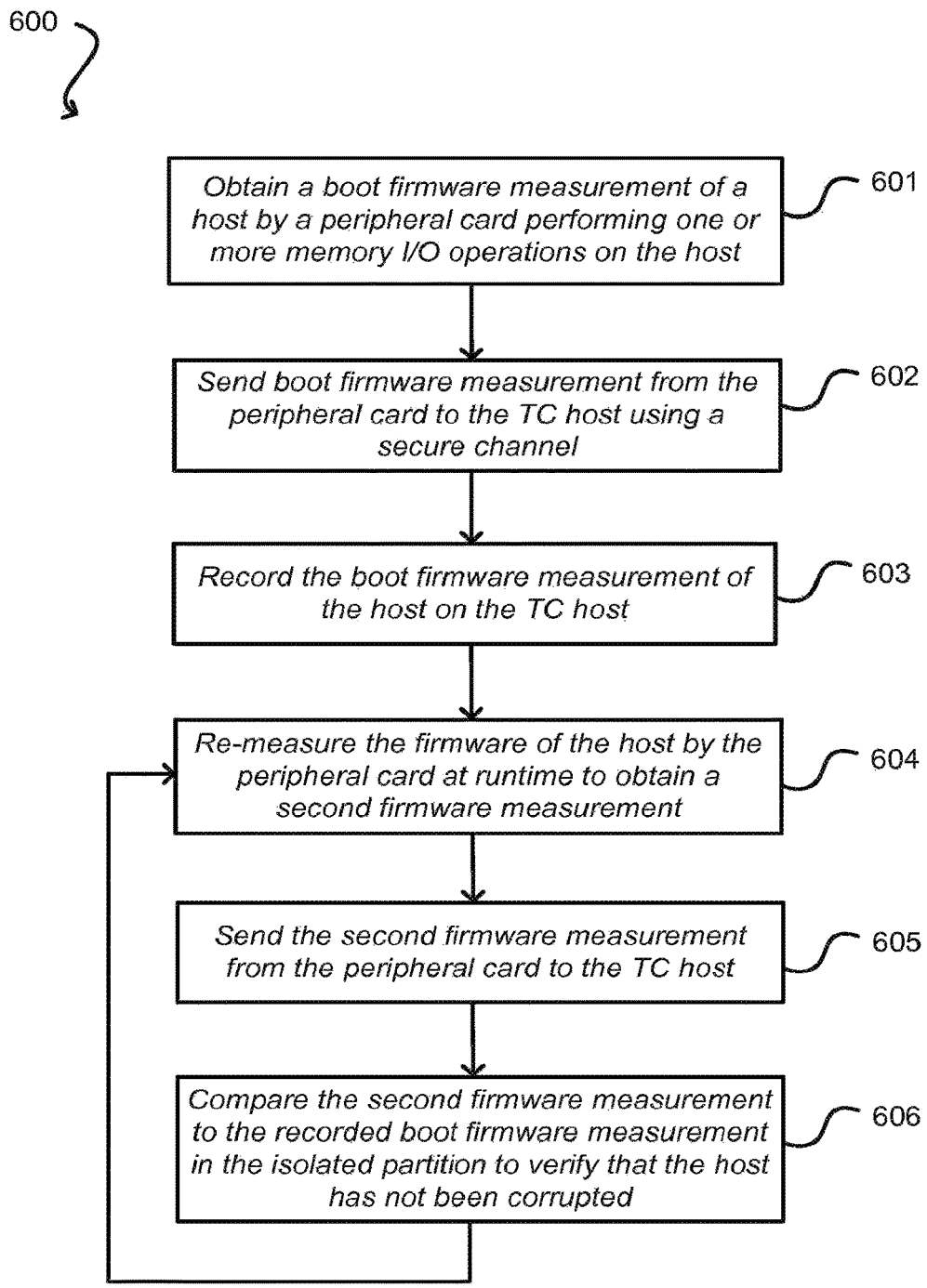
FIG. 6 illustrates an example process of providing boot firmware measurement by the trusted computing host, in accordance with various embodiments.

FIG. 6 illustrates an example process 600 of providing boot firmware measurement by the trusted computing host, in accordance with various embodiments. In operation 601, a peripheral card (or other hardware device) obtains a boot firmware measurement of a host computing device. The boot firmware measurement may be any summary (e.g., hash-key summary) of the hardware and/or software configuration of the host computing device. In one embodiment, the boot firmware measurement is obtained by a peripheral card accessing one or more memory locations on the host computing device using direct memory access (DMA). For example, the peripheral card may trap one or more write operations to specific memory address ranges or perform other memory input/output (I/O) operations on the host computing device.

In operation 602, the peripheral card sends the boot firmware measurement to the trusted computing host using a secure channel established between the TC host and the peripheral card. Once the TC host receives the boot firmware measurement, it can record the measurement in the isolated partition associated with the host computing device, as shown in operation 603. In some embodiments, the TC host can compare the received boot firmware measurement to a pre-computed reference value stored in the isolated partition associated with the host computing device. If the values do not match, some portion of the software on the host computing device may be deemed corrupted and the TC host may assume that the host computing device did not boot correctly or contains some malware or other security thread on the device. The TC host may then perform corrective actions (e.g., as specified by a security policy). For example, the TC host may flag the host computing device, generate an alarm to notify an administrator, restart the host computing device or software running thereon, or perform any other action.

In operation 604, the peripheral card may re-measure the firmware of the host computing device at runtime to obtain a second firmware measurement for the host computing device. For example, the peripheral card may periodically (or upon request) access the same memory locations on the host computing device using DMA and hash the values in those memory locations to obtain the second firmware measurement. In operation 605, the peripheral card sends the second firmware measurement to the TC host. The second firmware measurement may be transmitted as part of a request to verify that the host computing device has not been corrupted. In one embodiment, the second firmware measurement is transmitted using the secure communication channel established between the peripheral card and the TC host.

In operation 606, the TC host may compare the second firmware measurement received from the peripheral card to the boot firmware measurement stored in the isolated partition in order to verify the host computing device. If the boot firmware measurement matches (i.e. is identical) to the second firmware measurement, the TC host may send a verification response to the peripheral card, indicating that the host computing device has not been corrupted. If the measurements do not match, the TC host may transmit a response indicating that the host computing device was not verified. In addition or in the alternative, the TC host may perform corrective actions, such as notifying various users or services, recording the event in a log or the like. In various embodiments, the re-measuring operation may be repeated periodically, such as upon expiration of certain time intervals, or may be performed upon request.

In some embodiments, the TC host may provide remote attestation based on the boot firmware measurement recorded for the host computing device. The remote attestation may be provided in response to receiving a request from an external party or from the host computing device to verify the host computing device. To perform remote attestation, the TC host can compare the stored boot firmware measurement to a received value in order to verify the host computing device, a virtual machine operating on the host computing device, or a user associated with the virtual machine. The value may be received from the host computing device to the TC host, or the value may be received from the external entity requesting the attestation.

In other embodiments, the TC host may seal a set of data to the boot firmware measurement in order to prevent other entities from reading the set of data. For example, the TC host may use a key derived (e.g., hashed) from the boot firmware measurement to encrypt the data. Any data that should be made private can be sealed to the boot firmware measurement. Sealing the data protects private information by binding it to host computing device's configuration information including the software and hardware being used. This means the data can be released only to a particular combination of software and hardware that was used to create the boot firmware measurement.

Figure 7A:
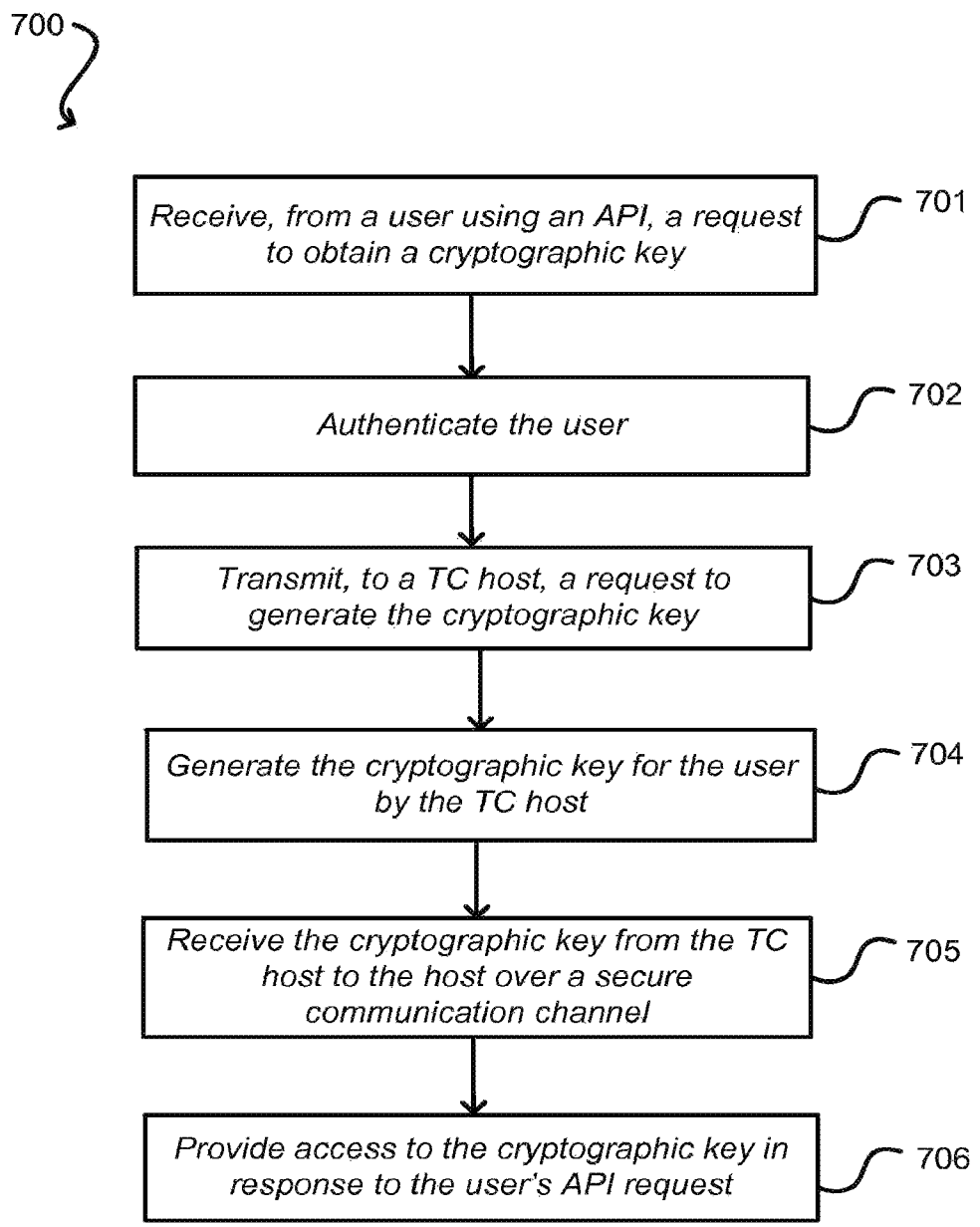
FIG. 7A illustrates an example process of generating cryptographic keys by a trusted computing host, in accordance with various embodiments.

FIG. 7A illustrates an example process 700 of generating cryptographic keys by a trusted computing host, in accordance with various embodiments. In operation 701, a host computing device receives a request from a user to obtain one or more cryptographic keys or other security attributes (e.g., digital certificates, etc.). The request may be received using an interface associated with a virtual machine provisioned for a user on the computing device. For example, the user may submit a web services API request over a network, such as getKey or getCertificate API call on the virtual machine executing on the host computing device. In operation 702, upon receiving the request, the host computing device may authenticate the user, such as by verifying a user name and password combination or other user credentials, as previously described. In addition, the host computing device may verify that the user is authorized to invoke the API call.

In operation 703, if the user is authenticated and authorized to make the API call, the host computing device transmits to the TC host a request to generate the one or more cryptographic keys on behalf of the host computing device. In one embodiment, a secured channel is established between the TC host and the host computing device. In operation 704, the TC host generates the cryptographic key for the user. In operation 705, the TC host sends the cryptographic key to the host computing device over the secure communication channel. In operation 706, the host computing device provides the user access to the cryptographic key. In some embodiments, the TC host may also generate or provide other security attributes to the host computing device. For example, in response to receiving the request from the host computing device, the TC host may submit a certificate signing request (CSR) to a certificate authority (CA). The TC host may then receive the digital identity certificate from the CA and provide the certificate to the host computing device.

Figure 7B:
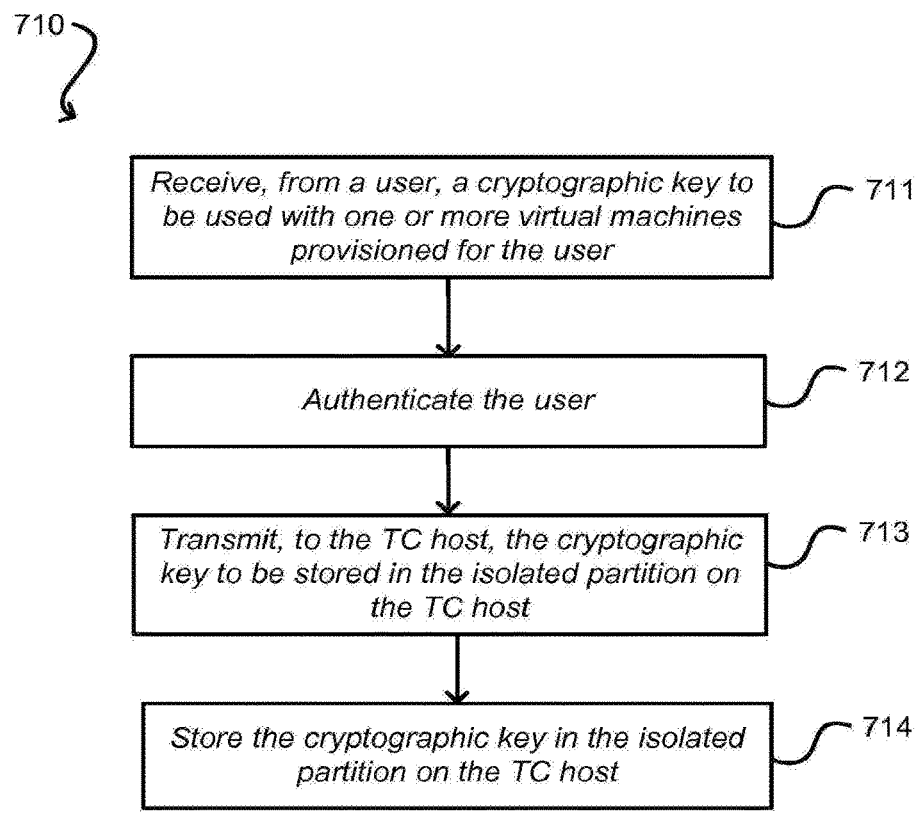
FIG. 7B illustrates an example process for managing cryptographic keys by a trusted computing host, in accordance with various embodiments.

FIG. 7B illustrates an example process 710 for managing cryptographic keys by a trusted computing host, in accordance with various embodiments. In operation 711, a host computing device receives from a user, a cryptographic key (or other security attributes) to be used with one or more virtual machines provisioned for the user on the host computing device. The one or more virtual machines may execute applications and services on behalf of the user, using the host computing device. In operation 712, the host computing device authenticates the user, such as by verifying a user name and password combination or other user credentials.

In operation 713, the host computing device transmits, to the TC host, the cryptographic key received from the user. The cryptographic key may be transmitted over the secure communication channel, along with a request to securely store the cryptographic key on the TC host on behalf of the user. In operation 714, the TC host stores the cryptographic key of the user in the isolated partition dedicated to the host computing device. The isolated partition may be encrypted using a different cryptographic key associated with the host computing device, such that only the host computing device may access the user's key. Because the user's key is securely maintained off of the host computing device, any virtual machine or other code operating on the host computing device cannot obtain access to the cryptographic key, unless it is able authenticate itself to the TC host. This provides improved security for maintaining the various credentials for the user, such as cryptographic keys, digital identity certificates, and the like.

Figure 8A:
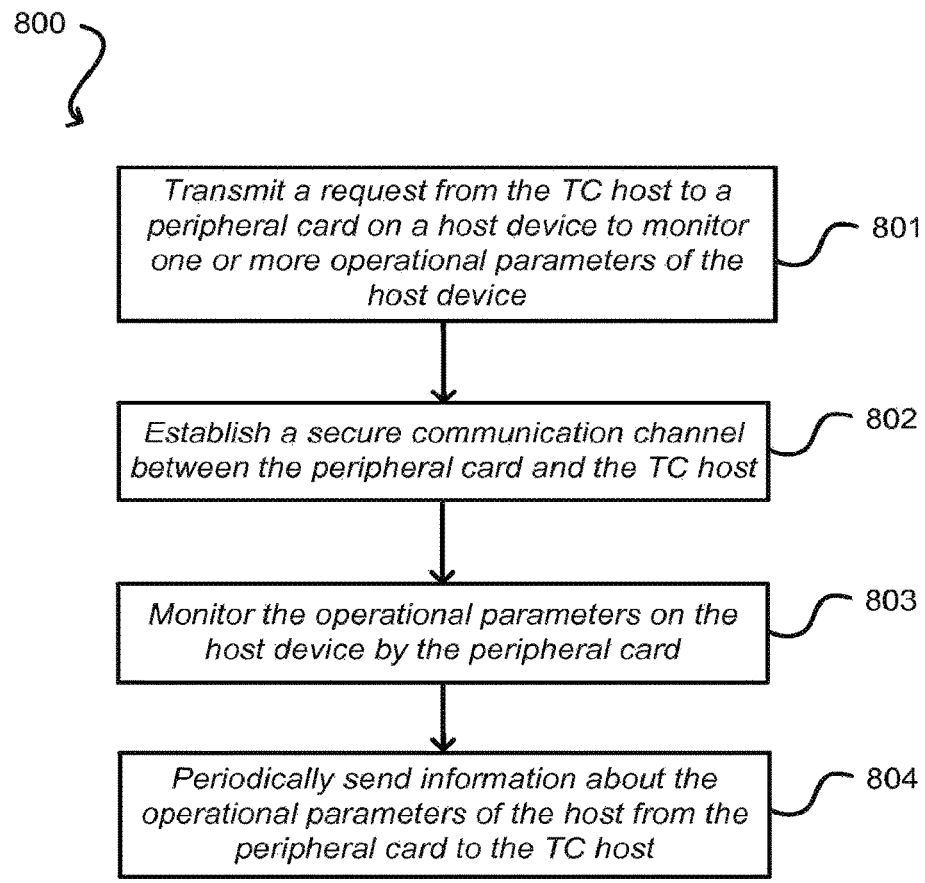
FIG. 8A illustrates an example process of monitoring a computing device by the TC host, in accordance with various embodiments.

FIG. 8A illustrates an example process 800 of monitoring a computing device by the TC host, in accordance with various embodiments. In operation 801, the TC host transmits a request to a peripheral card on a host computing device to monitor one or more operational parameters of the host computing device. The request may be an API call submitted to the peripheral card to monitor various parameters as part of security auditing and forensic monitoring to read memory belonging to running processes on the host computing device. For example, the TC host may request to monitor certain operations performed by virtual machine instances provisioned for a user in order to ensure that the user is not performing any malicious actions or the like. In operation 802, a secure communications channel is established between the TC host and the peripheral card embedded in the host computing device. For example, the secure communication channel may encrypt all communications transmitted over a network between the peripheral card and the TC host. In operation 803, the peripheral card monitors the specified parameters, such as by utilizing direct memory access (DMA) privileges to access the entire host memory (e.g., through IOMMU/VT-d settings). For example, the peripheral card may trap one or more write operations or other I/O operations performed on specified memory addresses of the host computing device.

In operation 804, the peripheral card sends the requested information about the operational parameters to the TC host using the established secure communication channel. The TC host may inspect and analyze the received information and determine whether any security threat exists on the host computing device. For example, the TC host may compare the information about the operational parameters to a set of expected information that may be stored in the isolated partition on the TC host.

Figure 8B:
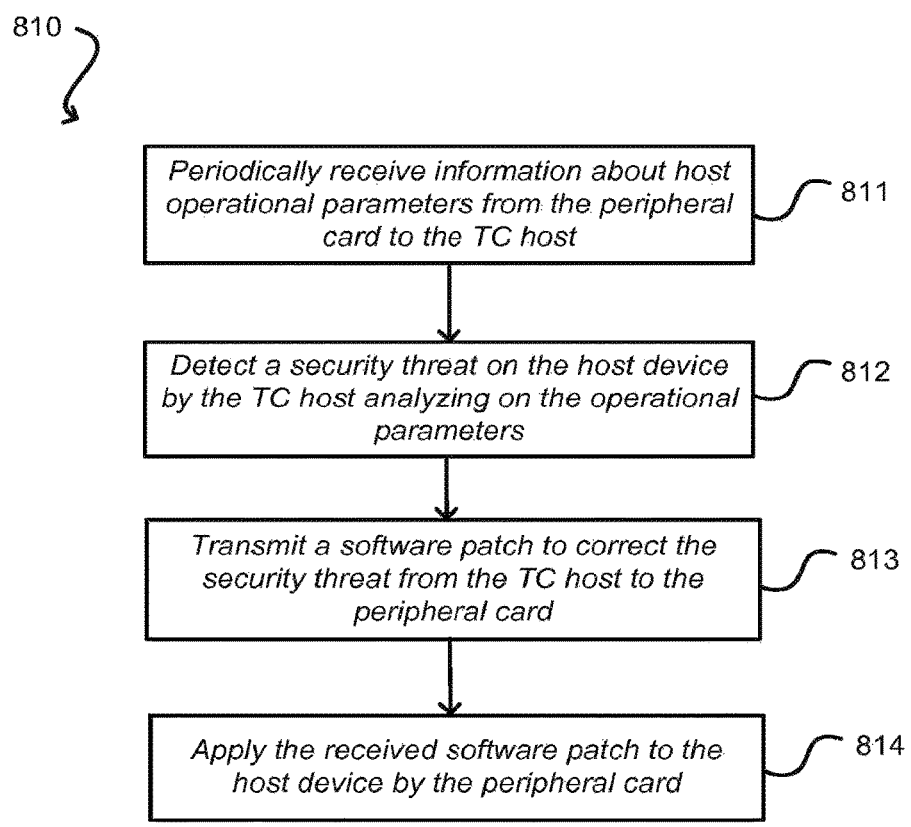
FIG. 8B illustrates an example process for detecting security threats on a computing device by a TC host, in accordance with various embodiments.

FIG. 8B illustrates an example process 810 for detecting security threats on a computing device by a TC host, in accordance with various embodiments. In operation 811, the TC host may periodically receive information about the operational parameters of the host computing device from the peripheral card embedded on the host computing device. In operation 812, the TC host analyzes the information to determine whether a security threat is present on the host computing device. If the TC host detects a security threat on the host computing device, the TC host may transmit a software patch to the host computing device, as shown in operation 813. For example, for security vulnerabilities discovered in the software stack (BIOS, Hypervisor, Kernel) running on the end host, the TC host can send appropriate software patches to the peripheral card which applies the software patches to the software stack on the end host, as shown in operation 814. The ability to access entire host memory (e.g., DMA) allows the peripheral card to apply these software patches directly to the memory of the host computing device.

Figure 9:
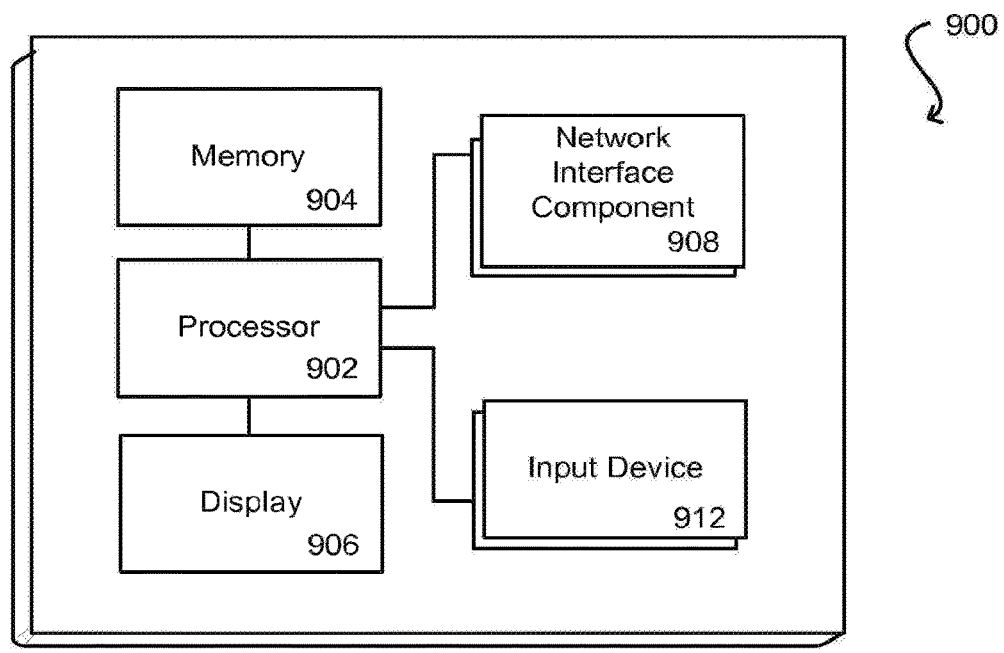
FIG. 9 illustrates a logical arrangement of a set of general components of an example computing device that can be utilized in accordance with various embodiments.

FIG. 9 illustrates a logical arrangement of a set of general components of an example computing device 900. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one input element 908 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 900 of FIG. 9 can include one or more network interface elements 908 for communicating over various networks, such as a Wi-Fi, Bluetooth, RF, wired, or wireless communication systems. The device in many embodiments can communicate with a network, such as the Internet, and may be able to communicate with other such devices.

Figure 10:
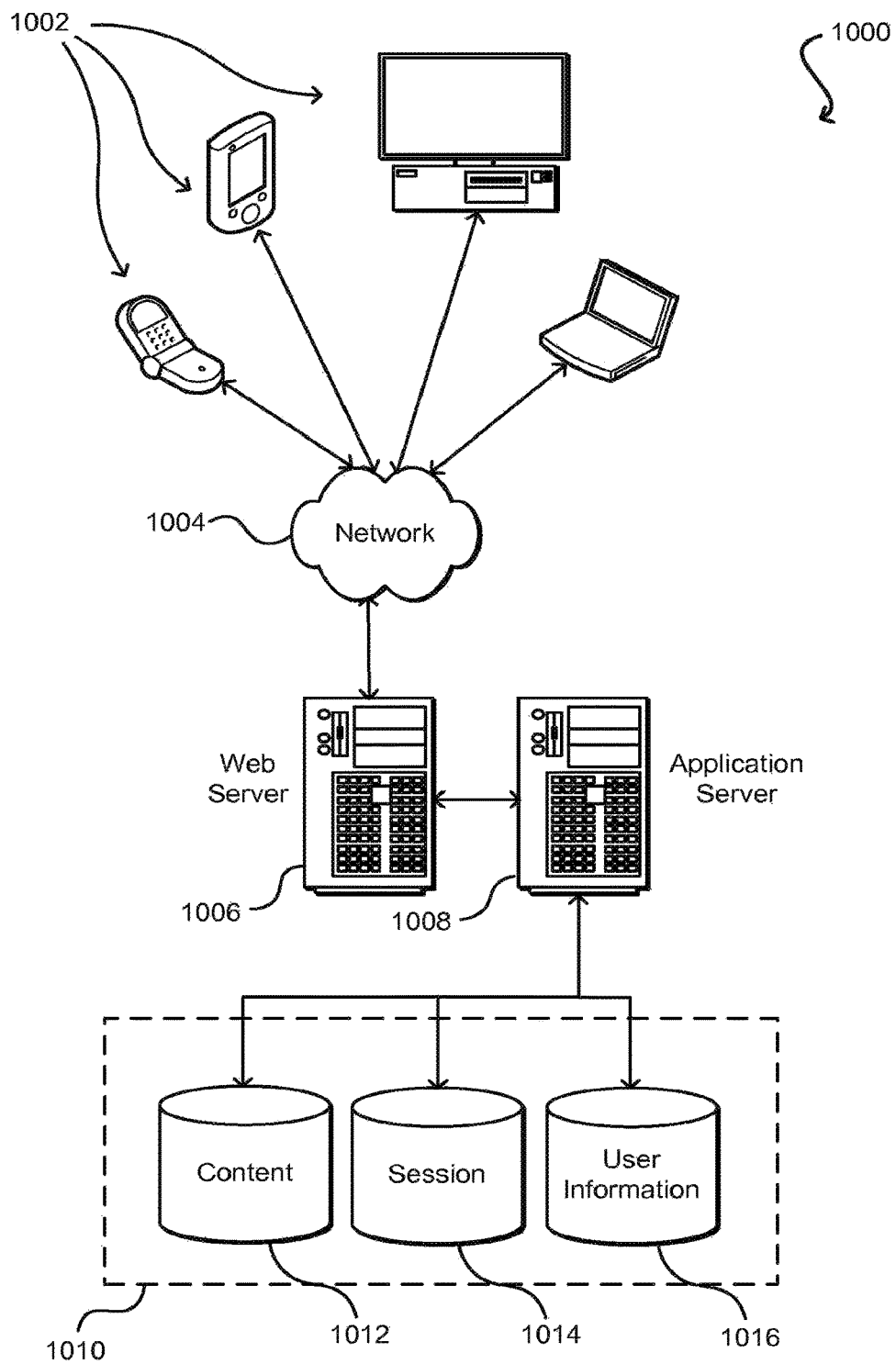
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
 a host computing device including a peripheral device, wherein the peripheral device includes a processor and memory including instructions that, when executed by the processor, cause the peripheral device to:
  monitor operational measurements associated with firmware of the host computing device, the operational measurements recorded in an isolated partition associated with the host computing device;
  transmit, over a secure channel, the operational measurements in response to a request to monitor the operational measurements; and
  perform the operations in response to verification of the operational measurements; and
 a computing device, comprising at least one processor and memory including instructions that, when executed by the processor, cause the computing device to:
  transmit the request to monitor the operational measurements of the host computing device;
  receive, over the secure channel, the operational measurements from the peripheral device;
  verify the operational measurements;
  enable, based at least in part on verification of the operational measurements, the host computing device to perform the operations; and
  store the verified operational measurements.

2. The computing system of claim 1, wherein the computing device further comprises instructions that, when executed by the at least one processor, cause the computing device to:
 determine, based at least in part on the operational measurements, that the firmware of the host computing device is out-of-date; and
 provide a software patch to the host computing device in response to a determination that the firmware is out-of-date.

3. The computing system of claim 1, wherein the computing device further comprises instructions that, when executed by the at least one processor, cause the computing device to:

determine a mismatch by comparing the operational measurements to one of a list of trusted values or a pre-computed operational reference value associated with the host computing device; and perform an action associated with the host computing device based at least on a policy corresponding to the mismatch.

4. The computing system of claim 1, wherein the peripheral device further includes instructions that, when executed by the processor, cause the peripheral device to receive an application programming interface (API) command to read memory used for a process executing on the host computing device during the performance of the operations and transmit data read from the memory of the host computing device to the computing device.

5. The computing system of claim 1, wherein the computing device further comprises instructions that, when executed by the at least one processor, cause the computing system to:

maintain an isolated partition associated with an end host computing device of a plurality of host computing devices, the isolated partition operable to perform security operations on the operational measurements received from the end host computing device; and store at least one of: the verified operational measurements or the pre-computed operational reference value.

6. The computing system of claim 5, wherein the instructions when executed by the at least one processor further enable the computing system to:

submit, to the computing device, an application programming interface (API) request to generate a cryptographic key for the end host computing device, the computing device operable to generate the cryptographic key on the computing device;

receive the cryptographic key in response to the API request; and encrypt the isolated partition of the computing device with the cryptographic key.

7. A host computing device, comprising:
a peripheral device;
at least one processor; and
memory including instructions that, when executed by the at least one processor, cause the host computing device to:
  establish a secure communication channel with a computing device;
  receive, from the computing device, a request to monitor an operational parameter associated with firmware of the host computing device, the operational parameter recorded in an isolated partition associated with the host computing device;
  obtain, using the peripheral device of the host computing device, operational measurements of the host computing device, wherein the peripheral device includes a peripheral device processor and peripheral device memory including instructions that, when executed by the peripheral device processor, cause the peripheral device to monitor the operational measurements of the host computing device in response to the request;
  provide information about the operational measurements to the computing device over the secure communication channel;
  receive a confirmation of verification of the operational measurements, the operational measurements verified by the computing device; and
  execute a boot operation on the host computing device in response to the confirmation of verification of the operational measurements.

8. The host computing device of claim 7, wherein the instructions when executed by the processor further enable the host computing device to:

receive a software patch from the computing device, wherein the computing device determines that the firmware of the host computing device is out-of-date based at least in part on the operational measurements; and apply the software patch to the host computing device.

9. The host computing device of claim 8, wherein the instructions when executed by the processor further enable the host computing device to:

transmit, using the peripheral device of the host computing device, the operational measurements to the computing device, wherein the computing device compares the operational measurements to a reference value to determine a mismatch; and receive one or more commands from the computing device in response to the mismatch, the one or more commands determined by the computing device based at least in part on a policy associated with the host computing device.

10. The host computing device of claim 9, wherein the one or more commands includes flagging the host computing device, generating an alarm to notify an administrator, restarting the host computing device or restarting software running on the host computing device.

11. The host computing device of claim 7, wherein the peripheral device of the host computing device:

receives an application programming interface (API) request to read a memory on the host computing device during a processing operation;

monitor the operational measurements of the host computing device during the processing operation; and transmit the operational measurements to the computing device.

12. The host computing device of claim 7, wherein the operational measurements are verified by the computing device using an isolated partition associated with the host computing device, the isolated partition operable to:

perform security operations on the information provided by the host computing device; and store one or more security attributes associated with the host computing device.

13. The host computing device of claim 12, wherein the instructions when executed by the processor further enable the host computing device to:

submit, to the computing device, an API request to generate a cryptographic key for the host computing device, the computing device operable to generate the cryptographic key;

receiving the cryptographic key in response to the API request; and providing, to the computing device, access to the cryptographic key, wherein the computing device is operable to store the cryptographic key into the isolated partition associated with the host computing device.

14. The host computing device of claim 7, wherein the instructions when executed by the processor further enable the host computing device to:

transmit the operational measurement to the computing device, wherein the computing device compares the operational measurement to a list of trusted values to verify the operational measurement and stores the operational measurement into an isolated partition associated with the host computing device.

15. A method comprising:

transmitting a request to monitor operational measurements associated with firmware of a host computing device, the operational measurements recorded in an isolated partition associated with the host computing device;

receiving, over a secure channel, the operational measurements from a peripheral device of the host computing device, wherein the peripheral device includes a peripheral device processor and peripheral device memory including instructions that, when executed by the peripheral device processor, cause the peripheral device to monitor the host computing device performing operations;

verifying the operational measurements;

enabling, based at least in part on the verifying of the operational measurements, the host computing device to perform the operations; and storing the verified operational measurements.

16. The method of claim 15, further comprising:

determining, based at least in part on the operational measurements, that the firmware of the host computing device is out-of-date; and provide a software patch to the host computing device in response to the determination that the firmware is out-of-date.

17. The method of claim 15, further comprising:

determining a mismatch by comparing the operational measurements to a list of trusted values or a pre-computed operational reference value associated with the host computing device; and performing one or more actions associated with the host computing device based at least on a policy corresponding to the mismatch.

18. The method of claim 17, further comprising:

maintain an isolated partition associated with the host computing device and operable to perform security operations on the operational measurements received from the peripheral device of the host computing device; and store at least one of the verified operational measurements or the pre-computed operational reference value.

19. The method of claim 18, further comprising:

receiving, from the host computing device, an application programming interface (API) request to generate a cryptographic key for the host computing device;

generating the cryptographic key on a computing device;

transmitting, to the host computing device, the cryptographic key in response to the API request;

receiving, from the host computing device, access to the cryptographic key; and storing the cryptographic key into the isolated partition associated with the host computing device.

20. The method of claim 18, further comprising:

receiving, from an external entity, a request to remotely attest authenticity of the host computing device; and authenticating the host computing device using the operational measurements stored in the isolated partition associated with the host computing device.

* * * * *